(12) United States Patent
Barfoot et al.

(10) Patent No.: US 9,237,775 B2
(45) Date of Patent: Jan. 19, 2016

(54) SELF-ALIGNING RATCHETING CLASP

(75) Inventors: Grady Barfoot, Denver, CO (US);
Michael T. Mayberry, Denver, CO (US); Richard Fitzpatrick, Longmont, CO (US); Brian Nakayama, Arvada, CO (US); Eric Nakayama, Broomfield, CO (US)

(73) Assignee: Magpul Industries Corporation, Louisville, CO (US)

( * ) Notice: Subject to any disclaimer, the term of this patent is extended or adjusted under 35 U.S.C. 154(b) by 381 days.

(21) Appl. No.: 13/495,240

(22) Filed: Jun. 13, 2012

(65) Prior Publication Data

US 2012/0317759 A1 Dec. 20, 2012

Related U.S. Application Data

(60) Provisional application No. 61/497,208, filed on Jun. 15, 2011.

(51) Int. Cl.
*A44B 19/00* (2006.01)
*A41F 1/00* (2006.01)
*F16B 2/22* (2006.01)
*A44B 11/25* (2006.01)

(52) U.S. Cl.
CPC .............. *A41F 1/008* (2013.01); *A44B 11/258* (2013.01); *F16B 2/22* (2013.01); *Y10T 24/45089* (2015.01)

(58) Field of Classification Search
CPC ................................. A41F 1/008; A44B 19/30
USPC ....... 24/580.1, 71 T, 71.1, 68 A, 68 BT, 68 F, 24/68 E, 71 R, 71 ST, 68 R
See application file for complete search history.

(56) References Cited

U.S. PATENT DOCUMENTS

| | | | |
|---|---|---|---|
| 3,991,444 A | 11/1976 | Bailey | |
| 4,133,082 A * | 1/1979 | Kanzaka | 24/68 R |
| 5,304,188 A | 4/1994 | Marogil | |
| 6,173,479 B1 | 1/2001 | Howell | |
| 6,553,635 B1 | 4/2003 | Howell | |
| 6,823,566 B2 | 11/2004 | Coffey | |
| 7,246,383 B2 * | 7/2007 | Musal | 2/418 |
| 7,254,872 B2 * | 8/2007 | Ross | 24/163 K |
| 7,866,005 B2 | 1/2011 | Vermeer | |
| 8,220,117 B2 * | 7/2012 | Lovato | 24/593.11 |
| 2006/0174459 A1 * | 8/2006 | Bledsoe | 24/634 |
| 2007/0234524 A1 | 10/2007 | Witt | |
| 2011/0146036 A1 * | 6/2011 | Chen | 24/68 E |
| 2012/0174355 A1 * | 7/2012 | Fraze | 24/68 A |

* cited by examiner

*Primary Examiner* — Robert J Sandy
*Assistant Examiner* — Matthew Sullivan
(74) *Attorney, Agent, or Firm* — Swanson & Bratschun, L.L.C.

(57) ABSTRACT

A clasp comprising a securing rail and a clasp body. The securing rail comprises an elongate rail comprising a rail top, a pair of opposing clasping flanges extending lengthwise of the rail and a plurality of locking teeth spaced and extending lengthwise of the rail. The clasp body is configured to receive the clasping flanges of the elongate rail and to secure the clasp body to the rail against radial movement relative to the rail. At least one engaging tooth is operatively associated with the clasp body to engage the first plurality of locking teeth to secure the clasp body against movement in at least one axial direction lengthwise of the elongate rail with the clasping flanges received in the clasp body.

12 Claims, 17 Drawing Sheets

SELF-ALIGNING RATCHETING CLASP

RELATED APPLICATIONS

This application claims priority from U.S. Provisional Patent Application Ser. No. 61/497,208, filed Jun. 15, 2011, entitled "Self-Aligning Ratcheting Clasp," which is hereby incorporated by reference.

TECHNICAL FIELD

The present disclosure is directed toward closures for pocket flaps, and more particularly to a self-aligning ratcheting clasp.

BACKGROUND

Various pocket flap closures are now in use in a variety of applications, including military applications. Typically these closures include a rail attached to the pocket and a clasp body attached to the flap, with the clasp body being configured to snap onto the rail at a select location lengthwise of the rail to secure the flap to the pocket at a desired degree of tightness. One such flap closure is shown in U.S. Pat. No. 6,173,479. The particular closure disclosed in the '479 patent does not provide a ratcheting engagement between the clasp body and the rail whereby the pocket can be tightened by sliding the clasp body relative to the rail in a lengthwise direction. The closure disclosed in the '479 patent also fails to provide a convenient mechanism for releasing the clasp body from the rail when desired.

The present invention is directed toward overcoming one or more of the problems discussed above.

SUMMARY

Figure 1:
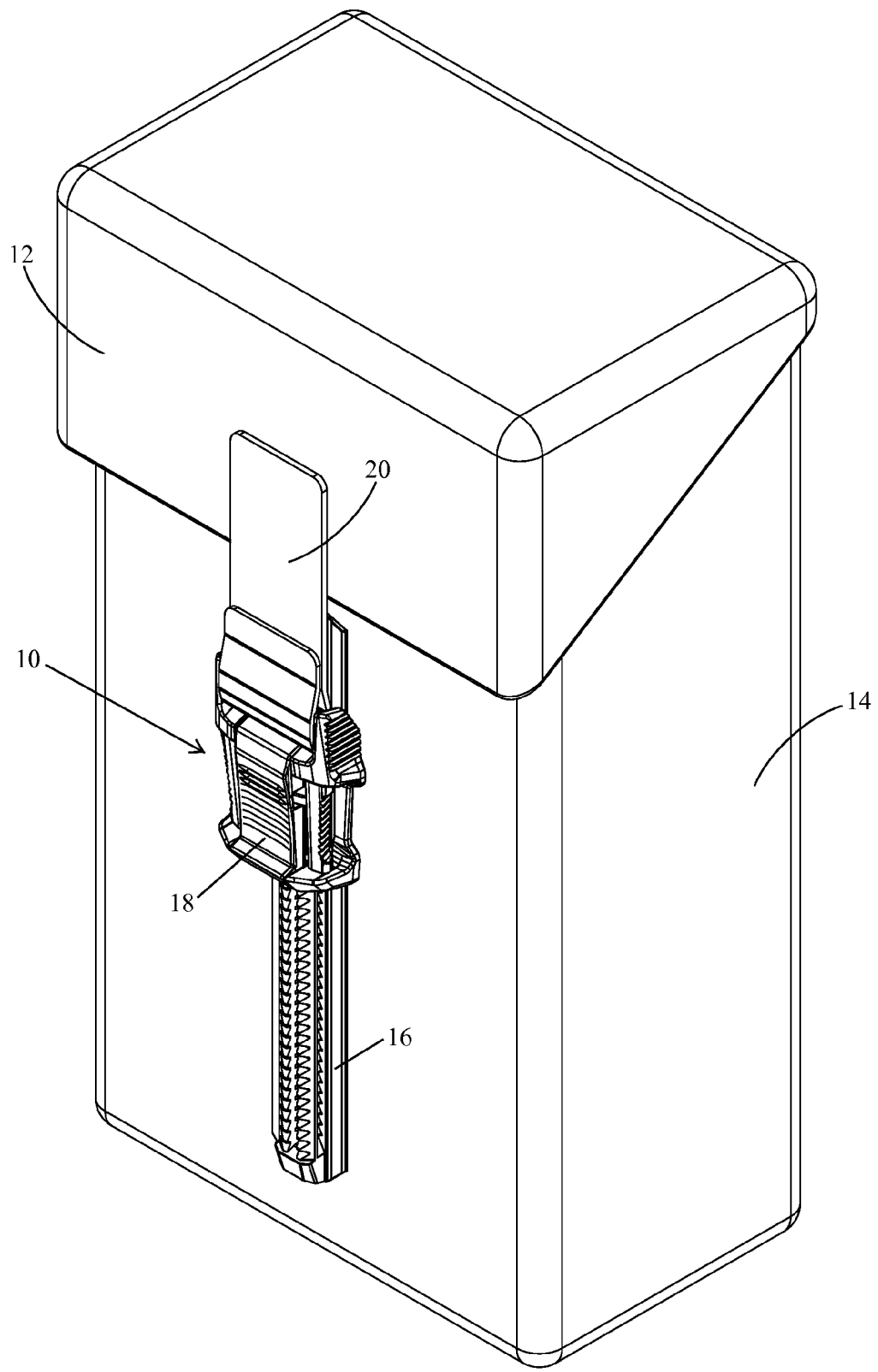
FIG. 1 is a perspective view of a container having a container lid attached to the container body by an embodiment of a self-aligning ratcheting as clasp disclosed herein.
Figure 2:
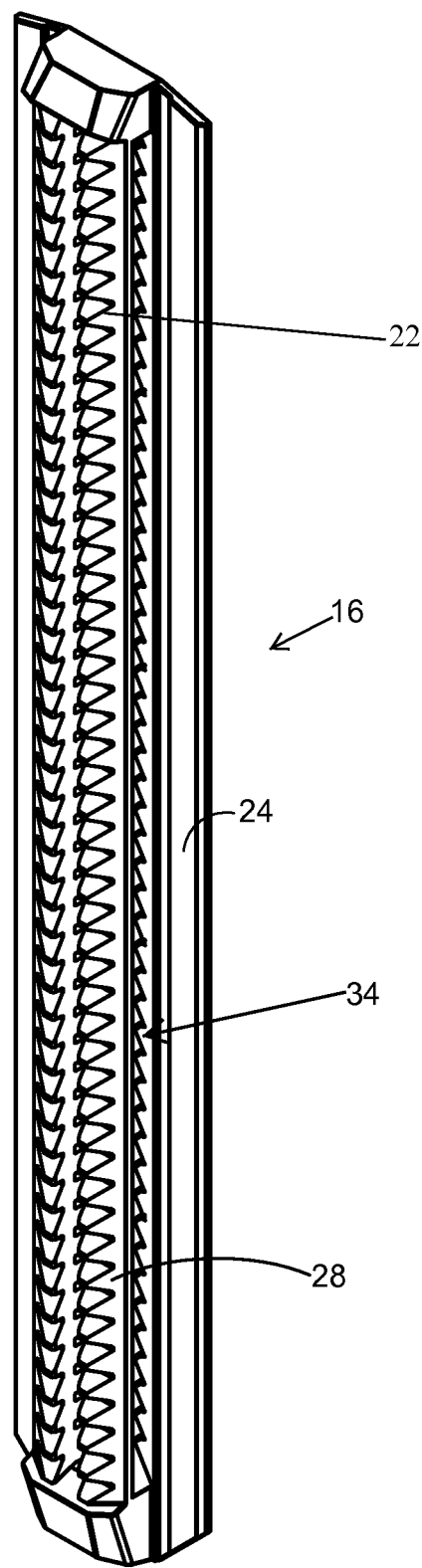
FIG. 2 is a perspective view of an elongate rail of the clasp of FIG. 1.
Figure 3:
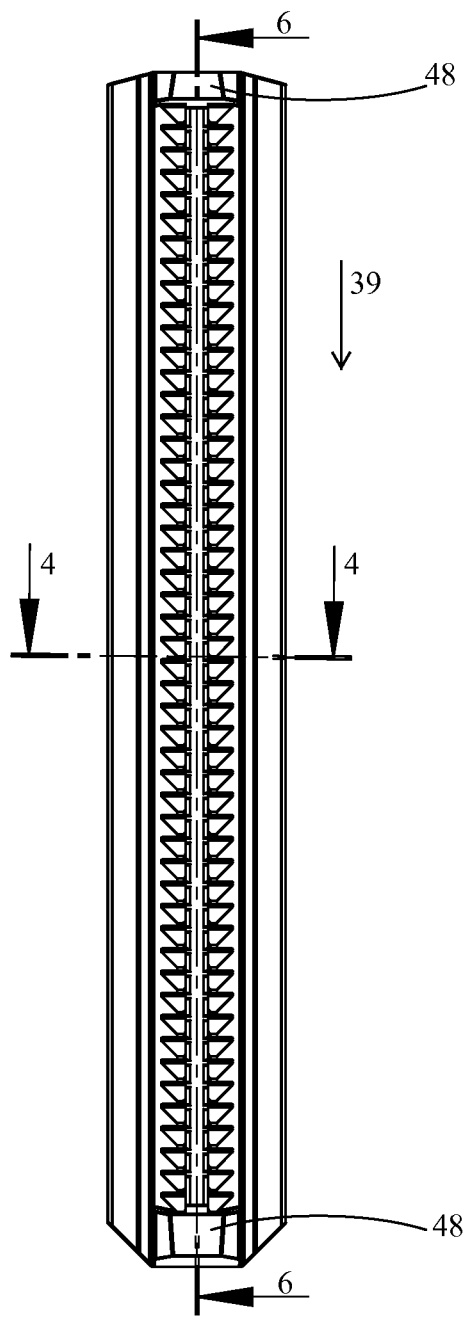
FIG. 3 is a top plan view of the elongate rail of FIG. 2.

A first aspect is a clasp which comprises an elongate track and a clasp body. The elongate track comprises an elongate rail comprising a top, a pair of opposing clasping flanges extending lengthwise of the rail, a plurality of locking teeth spaced and extending lengthwise of the rail and an alignment trough in the top extending lengthwise of the rail. The clasp body comprises a clasp frame. A pair of opposing jaws are operatively associated with the clasp frame and each of the opposing jaws are configured to receive one of the clasping flanges of the elongate rail. The opposing jaws are further configured to bias towards each other with the clasping flanges received therein to nest the clasping flanges between the opposing jaws and to secure the clasp body to the rail against radial movement relative to the rail. An alignment blade extends from the clasp frame and is configured to be received in the alignment trough with the opposing jaws receiving the clasping flanges. An engaging tooth is operatively associated with the clasp frame to engage at least one of the plurality of locking teeth to secure the clasp body against movement in at least one axial direction lengthwise of the engagement rail with the clasping flanges nested between the opposing jaws. In one embodiment, the alignment blade extends from the clasp frame between the opposing jaws a distance sufficient to be received in the alignment trough without the opposing jaws receiving the clasping flanges. In another embodiment, two pairs of opposing jaws are spaced relative to the clasp body to receive lengthwise spaced portions of the clasping flanges of the elongate rail. In at least one embodiment the engaging tooth and the plurality of locking teeth are configured for ratchet engagement, whereby the clasp body can slide one axial direction but not an opposite axial direction relative to the elongate rail with the clasping flanges nested between the opposing jaws. Embodiments may include a pair of opposing levers, each lever being operatively associated with an opposing jaw and pivotably attached to the clasp body, the levers being configured such that upon being squeezed together a first distance the jaws released the clasping flanges.

Another aspect also comprises an elongate track and a clasp body. The elongate track comprises an elongate rail comprising a base, a pair of opposing clasping flanges extending lengthwise of the rail spaced from the base and a plurality of locking teeth spaced and extending lengthwise of the rail. The clasp body comprises a clasp frame and a pair of opposing jaws operatively associated with the clasp frame. Each of the opposing jaws is configured to receive one of the clasping flanges of the elongate rail. The opposing jaws are further configured to bias towards each other with the clasping flanges received therein to nest the clasping flanges between the opposing jaws and to secure the clasp body to the rail against radial movement relative to the rail. An engaging tooth is operatively associated with the clasp frame to engage at least one of the plurality of locking teeth to secure the clasp body against movement in at least one axial direction lengthwise of the elongate rail with the clasping flanges nested between the opposing jaws. A pair of opposing levers are provided, with each lever being operatively associated with the jaw and the clamp frame, the levers being configured so that upon being squeezed together a first distance the jaws release the clasping flanges.

Yet another aspect also comprises an elongate track and a clasp body. The elongate track comprises an elongate rail comprising a base, a pair of opposing clasping flanges extending lengthwise of the rail spaced from the base and a plurality of locking teeth spaced and extending lengthwise of the rail between each of the clasping flanges and the base of the rail. The clasp body comprises a clasp frame and a pair of opposing jaws operatively associated with the clasp frame. Each of the opposing jaws is configured to receive one of the clasping flanges of the elongate rail. The opposing jaws are further configured to bias towards each other with the clasping flanges received therein to nest the clasping flanges between the opposing jaws and to secure the clasp body to the rail against radial movement relative to the rail. At least one engaging tooth is operatively associated with each jaw to engage at least one of the plurality of locking teeth to secure the clasp body against movement in at least one axial direction lengthwise of the elongate rail with the clasping flanges nested between opposing jaws.

A further aspect of the invention is a clasp comprising a securing rail and a clasp body. The securing rail comprises an elongate rail comprising a rail top, a pair of opposing clasping flanges extending lengthwise of the rail and a plurality of locking teeth spaced and extending lengthwise of the rail. The clasp body comprises a clasp frame and is configured to receive the clasping flanges of the elongate rail and to secure the clasp body to the rail against radial movement relative to the rail. At least one engaging tooth is operatively associated with the clasp body to engage the first plurality of locking teeth to secure the clasp body against movement in at least one axial direction lengthwise of the elongate rail with the clasping flanges received in the clasp body.

DETAILED DESCRIPTION

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

A self-aligning ratcheting clasp 10 is shown in FIG. 1 attaching the lid 12 of a container to the container body 14. The clasp 10 is usable with any kind of container to which a lid or flap is to be attached. For example, the container body 14 could be a pocket in a garment and the lid 12 could be a flap of material to be attached to the pocket. In most instances the lid or flap is pivoted to cover the container and is secured in place using the self-aligning ratcheting clasp 10.

As depicted in FIG. 1, the self-aligning ratcheting clasp 10 comprises two major components, an elongate track 16 and a clasp body 18. As viewed in FIG. 1, the track 16 is attached to the outside of the container and the clasp body 18 is attached to the container lid 12 by means of webbing 20.

Figure 4:
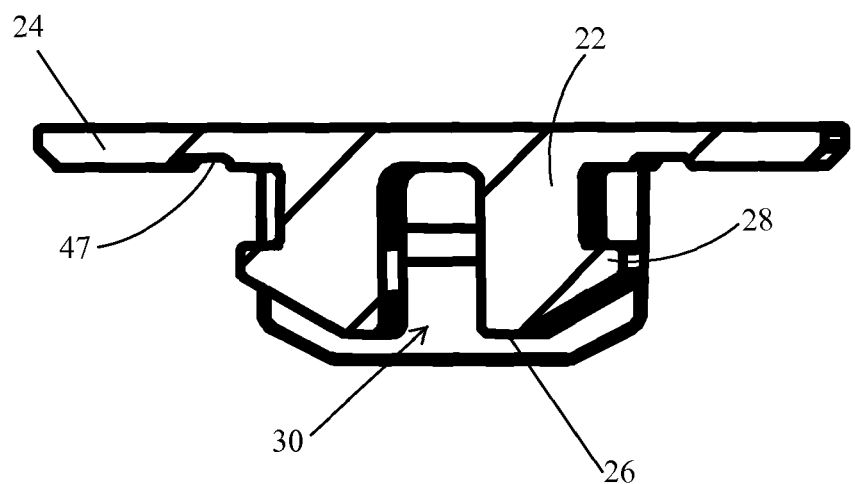
FIG. 4 is a cross-section of the elongate rail taken along line 4-4 of FIG. 3.

The track 16 is shown in greater detail in FIGS. 2-6. The track 16 comprises an elongate rail 22 extending from a base 24. Referring to FIG. 4, the elongate rail 22 further comprises a top 26 has a pair of clasping flanges 28 extending lengthwise of the rail. An alignment trough 30 is defined in the top of the elongate rail 22 and extends lengthwise of the rail 22. In the embodiment of the elongate rail 22 illustrated herein, the alignment trough 30 and the clasping flanges 28 extend the entire length of the elongate rail 22. In other embodiments the alignment trough 30 or the clasping flanges 28 may extend only a portion of the length of the elongate rail 22. As depicted in FIG. 4, the alignment trough 30 is deep enough that the elongate rail 22 could be characterized as a pair of parallel rails each having an oppositely facing clasping flange 28. Such a characterization is considered the same as the description of the elongate rail 22 having an alignment trough 30 extending lengthwise of the elongate rail 22.

Figure 5:
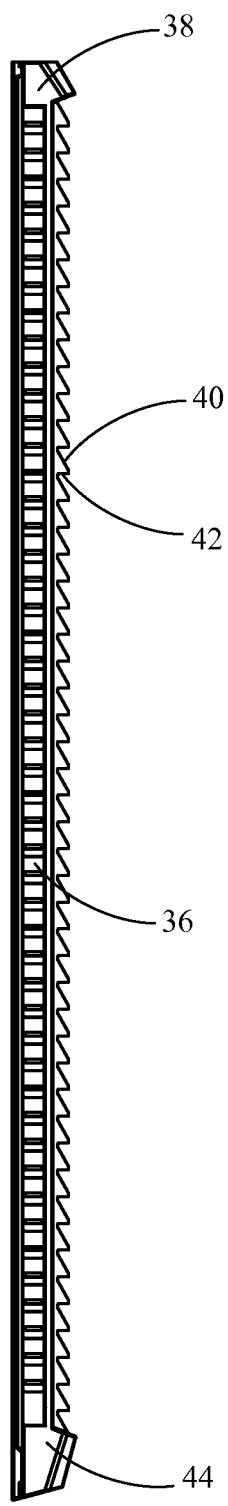
FIG. 5 is a left side elevation view of the elongate rail.
Figure 6:
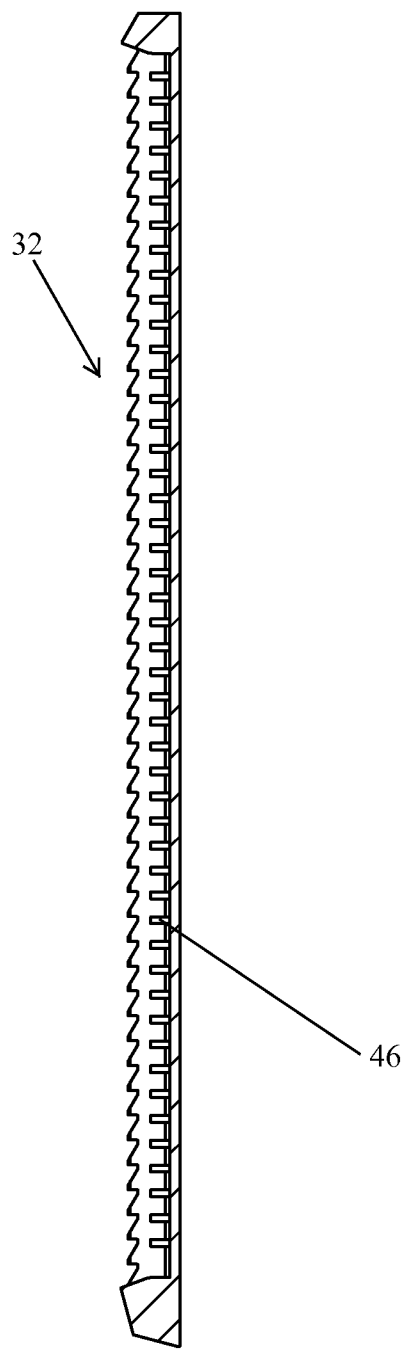
FIG. 6 is a cross-section of the elongate rail taken along line 6-6 of FIG. 3.

Referring to FIGS. 2-5, a plurality of spaced locking teeth extend lengthwise of the elongate rail 22. In the embodiment illustrated herein, the elongate rail 22 actually has three pluralities of spaced locking teeth extending lengthwise of the elongate rail 22. The first plurality of spaced locking teeth 32 are formed in the top of the rail on each side of the alignment trough and have a saw-tooth configuration to enable a ratcheting effect when used in combination with the clasp body 18, which will be described in greater detail below. The second plurality of spaced locking teeth 34 reside between the clasping flanges 28 and the base 24 on the right side of the elongate rail 22 and are best viewed in FIG. 2. The third plurality of spaced locking teeth 36 reside between the clasping flanges 28 and the base 24 on the left side of the elongate rail 22 and are best viewed in FIG. 5. The second and third pluralities of spaced locking teeth 34, 36, like the first plurality of spaced locking teeth 32, have a saw-tooth configuration to provide a ratcheting action. With reference to FIGS. 5 and 6 in the illustrated embodiment, the locking teeth have an inclined surface 40 facing a leading end 38 of the elongate rail 22 and a surface 42 perpendicular to the length of the rail facing the bottom end 44 of the elongate rail 22.

Referring to FIG. 6, in some embodiments it may be useful to provide holes 46 within the alignment trough 30 to facilitate clearing debris. Such holes may also be provided in addition or in the alternative lengthwise along the axis in the bottom of the trough 30 or along the base 24, for example, in the divot 47 (see FIG. 4). The securing rail 16 further includes a stop 48 at each end.

Figure 7:
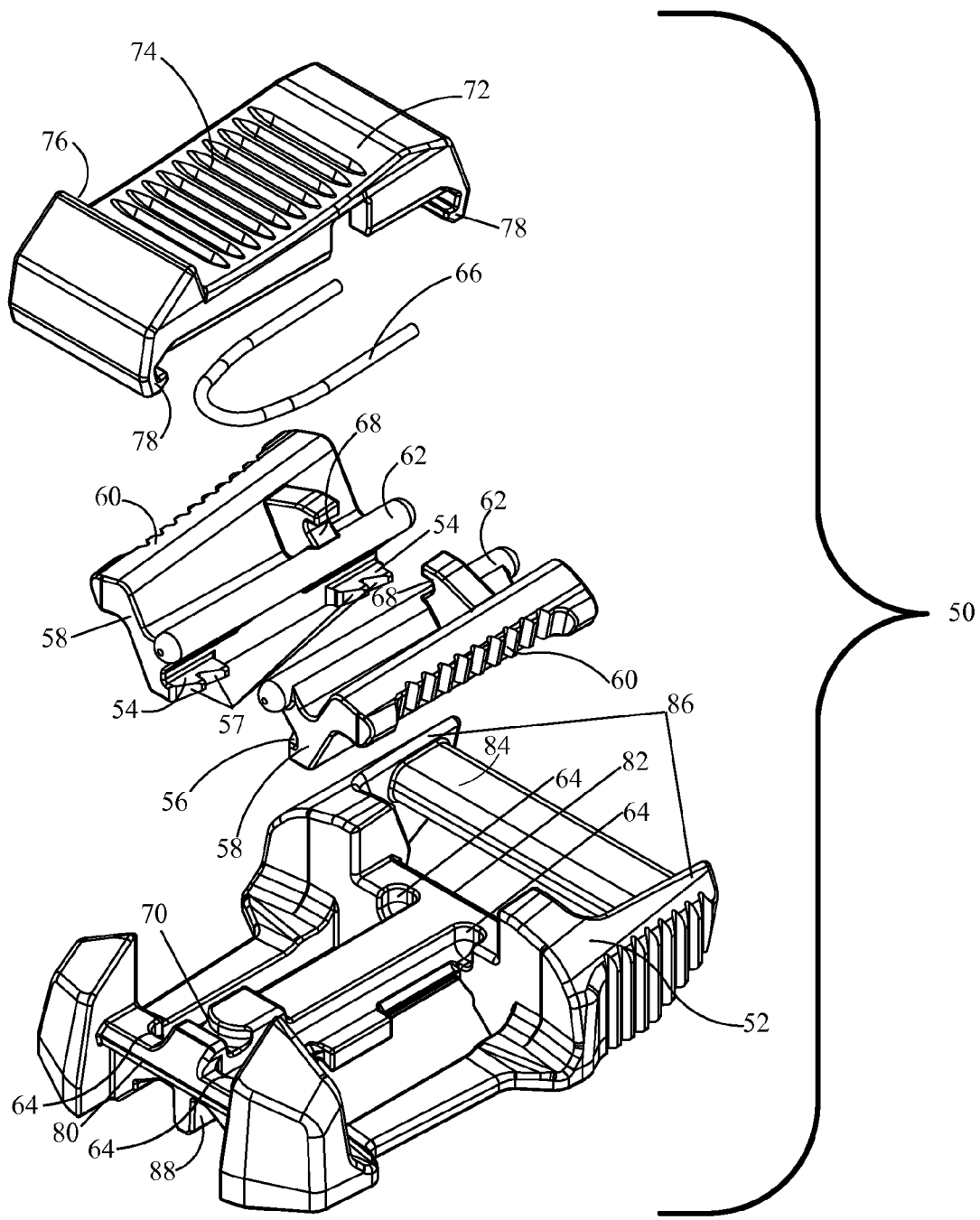
FIG. 7 is an exploded view of a first embodiment of a clasp body of the self-aligning ratcheting clasp of FIG. 1.

A first embodiment of the clasp body 18 depicted in FIG. 1, which is sometimes referred to herein as a multi-part clasp body 50, is shown in an exploded view in FIG. 7. The multi-piece clasp body 50 comprises a clasp frame 52 and two pairs of opposing jaws 54, 56, which, when assembled, are operatively associated with the clasp frame 52. In the embodiment of FIG. 7, each pair of the opposing jaws 54, 56 are spaced lengthwise of and attached at opposite sides of a distal end of a lever 58. Each of the opposing jaws 54, 56 has engaging teeth 57 for engaging the second and third pluralities of locking teeth, as will be explained further below. The proximal end of the lever has a serrated edge 60 opposite the opposing jaws 54, 56. An axle 62 is attached to the lever 58 between the opposing jaws 54, 56 and the serrated edge 60. The axle 62 of each of the levers 58 is configured to be received in receptacles 64 of the clasp frame 52 and the levers 58 pivot about the axle 62 when received in the receptacles 64. A U-spring 66 is configured to be received in the spring slots 68 extending from the levers 58 with the base of the U received in the frame spring slot 70.

A cover 72 having serrations 74 and a grip surface 76 has a pair of opposing grasping flanges 78 on its underside. The serrations 74 and grip surface 76 facilitate manipulation of the cover 72 but may be omitted or replaced with similar grip enhancing features.

When assembled, the axles 62 are received in the receptacles 64 leaving the first and second pairs of opposing jaws 54, 56 in their opposed configuration. The U-spring 66 is placed with each arm of the U received in one of the spring slots 68 and the base of the U received in the frame spring slot 70. In this manner, each of the pairs of opposing jaws 54, 56 are biased toward each other by the action of the U-spring 66. The clasp body 18 is maintained in its assembled state by the cover 72 with the opposing grasping flanges 78 snapped into engagement with retaining surfaces 80, 82.

The clasp frame 52 further includes an attachment bar 84 extending between supports 86 at a trailing end of the clasp frame 52. This attachment bar can be used for attaching the clasp body to, for example, a nylon webbing as illustrated in FIG. 1. An alignment blade 88 extends from the bottom and lengthwise of the clasp frame 52 between a leading and a trailing end.

Figure 8:
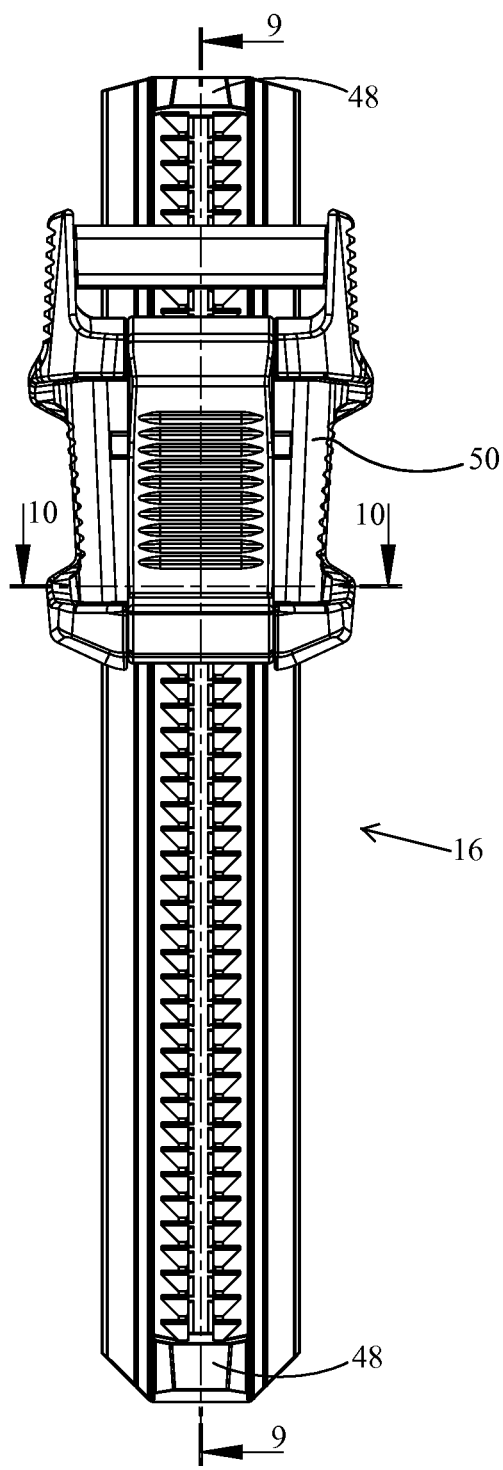
FIG. 8 is a plan view of the assembled clasp body of FIG. 7 received on an elongate rail of FIG. 2.
Figure 9:
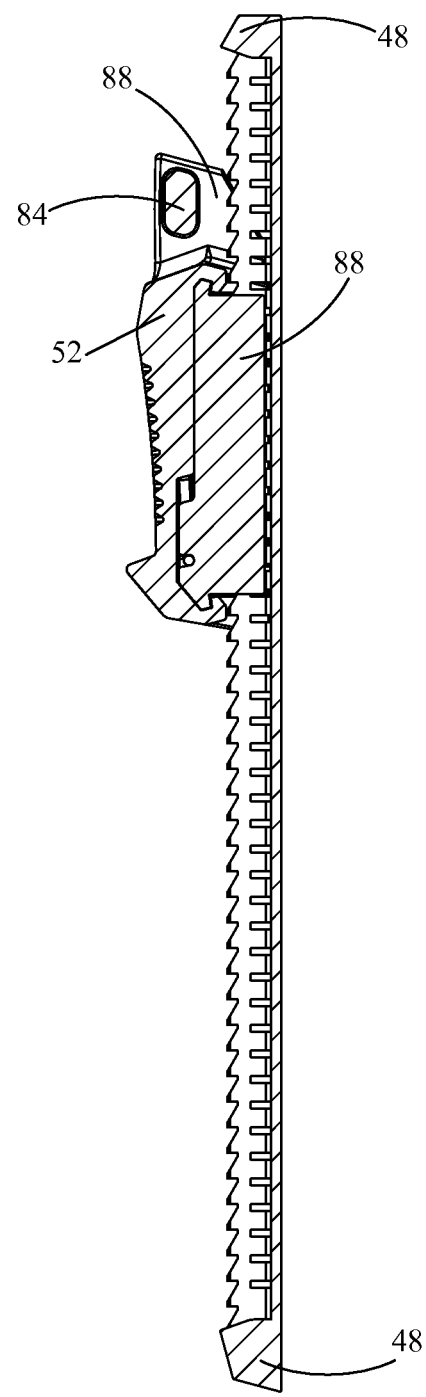
FIG. 9 is a cross-section taken along line 9-9 of FIG. 8.
Figure 10:
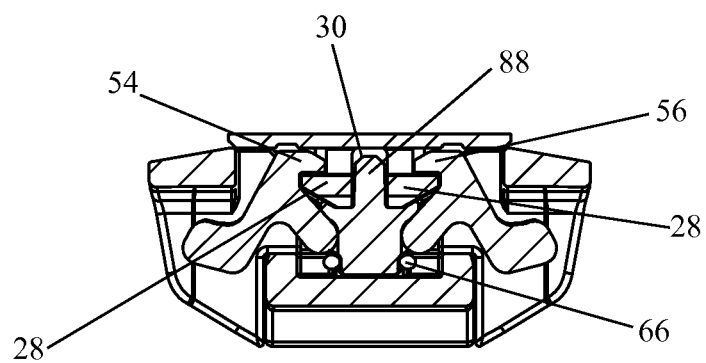
FIG. 10 is a cross-section taken along line 10-10 of FIG. 8.

The multi-piece clasp body 50 is shown in operative association or attached to a securing rail 16 in FIG. 8. Referring to FIG. 10, with the multi-piece clasp body 50 operatively associated with the securing rail 16, the opposing jaws 54, 56 receive the clasping flanges 28 to nest the clasping flanges 28 and secure the clasp body 18 to the elongate rail 22 against radial movement relative to the rail. As used herein, "secured against radial movement relative to the rail" means movement away from the page as depicted in FIG. 8. The U-spring 66 biases the opposing jaws 54, 56 toward each other with the clasping flanges 28 received therein to nest the clasping flanges 28 between the opposing jaws 54, 56. The engaging teeth 57 have complimentary angled surfaces to nest within the second and plurality of spaced locking teeth 34, 36. The alignment blade 88 is received in the alignment trough 30 to stabilize the clasp body 18 relative to the securing rail 16. Because of the inclined surfaces on the top of the clasping flanges 28, the multi-piece clasp body 50 can be pushed into engagement with the securing rail 16 by application of a force to the serrations 74. This action splays the jaws relative to one another until the jaws reach the end of the clasping flanges 28 and snap under the engagement flanges to nest the engagement flanges between the opposing jaws. Once attached in this manner, the multi-piece clasp body 50 can be moved in the direction of the arrow 39 by application of a force in the direction of the arrow 39 by virtue of the cooperating ratcheted configuration of the engaging teeth 57 and the locking teeth of the second and third plurality of spaced locking teeth 34, 36. However, the multi-piece clasp body 50 cannot be moved opposite the direction of the arrow 39. As a result, when deployed on a container body 14 as depicted in FIG. 1, the lid 12 may be readily tightened simply by pushing downward on the multi-piece clasp body 50 and loosening is prevented by engagement of the engaging teeth 57 and the locking teeth 34, 36. To release the multi-piece clasp body 50, the levers 58 are grasped by the fingers of a user and squeezed toward one another to overcome the force of the U-spring 66 and to bring the opposing jaws 54, 56 out of engagement with the clasping flanges 28. In one embodiment the levers 58 can be squeezed a first distance to disengage the opposing jaws 54, 56 entirely from the clasping flanges 28. The levers 58 can be squeezed a second distance less than the first distance such that the engaging teeth 57 disengage the second and third plurality of spaced locking teeth 34, 36 to allow movement of the clasp body 18 in either axial direction lengthwise of the elongate rail 22 while still preventing complete disengagement of the clasping flanges 28 and thus preventing radial movement of the multi-piece clasp body 50 relative to the securing rail 16. The mating of the alignment flange/alignment trough further prevents inadvertent release of the clasp body if only one of the levers 58 is pushed inward.

Figure 11:
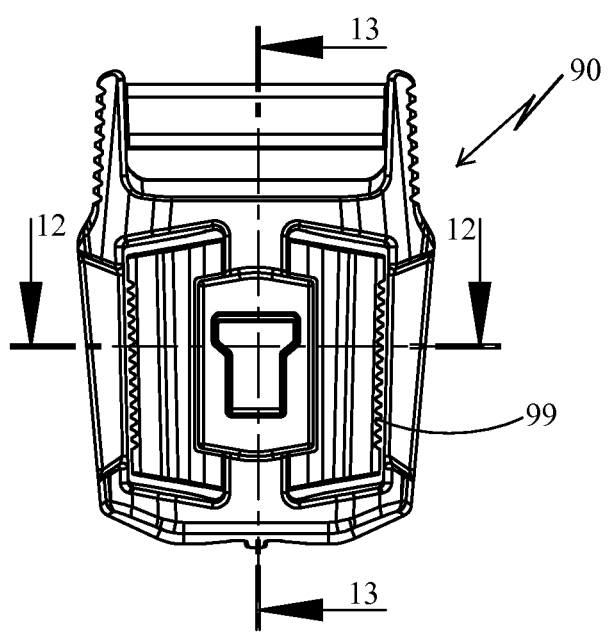
FIG. 11 is a top plan view of a second embodiment of a clasp body of the self-aligning ratcheting clasp of FIG. 1.
Figure 11A:
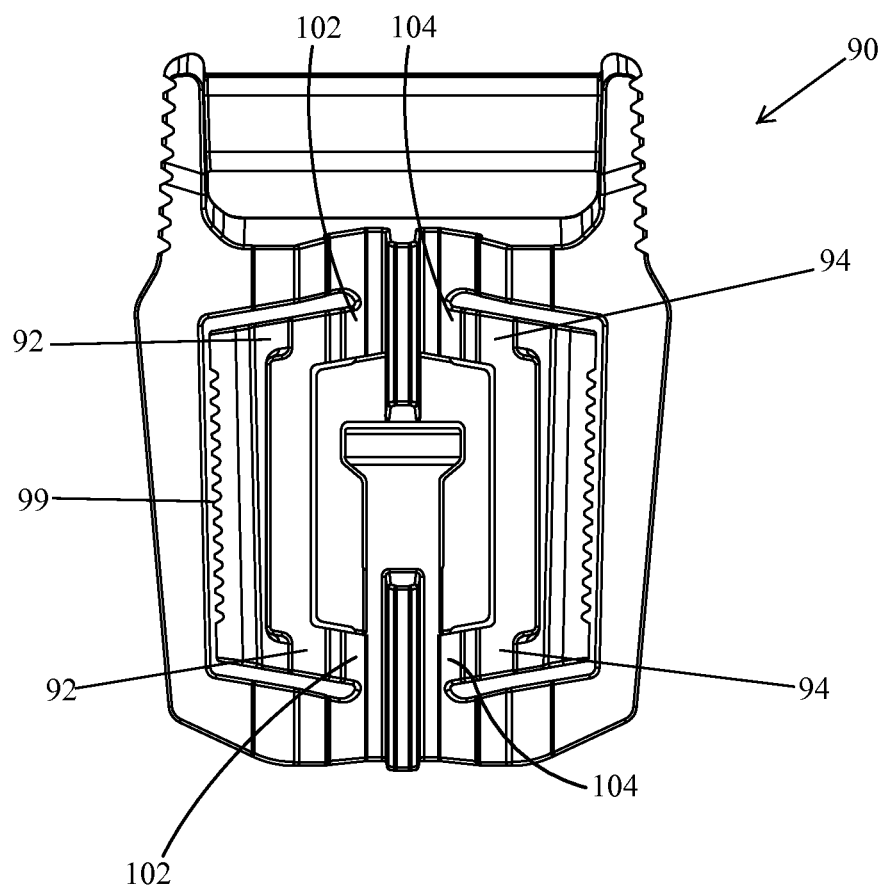
FIG. 11A is a bottom plan view of the clasp body of FIG. 11.
Figure 12:
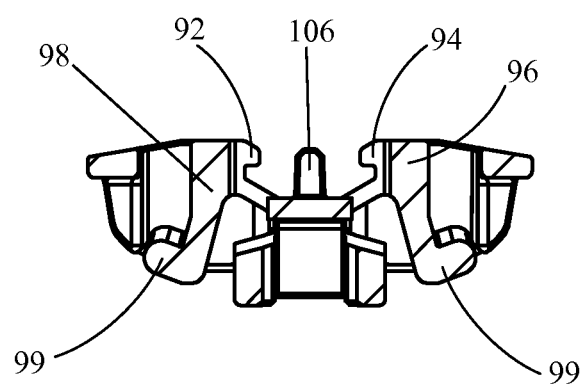
FIG. 12 is a cross-section of the clasp body of FIG. 11 taken along line 12-12 of FIG. 11.
Figure 13:
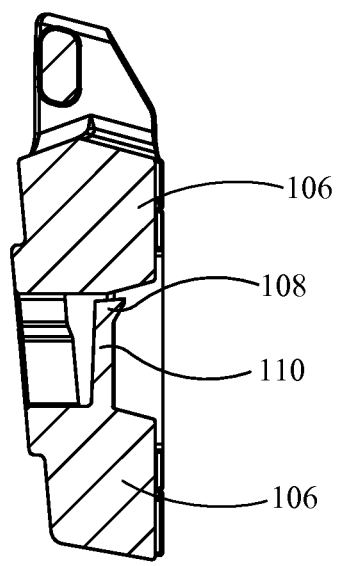
FIG. 13 is a cross-section of the clasp body of FIG. 11 taken along line 13-13 of FIG. 11.

FIG. 11 is a top plan view of a second embodiment of a self-aligning ratcheting clasp, which may also be referred to herein as a single piece clasp body 90. FIG. 11A is a bottom plan view of the clasp body of FIG. 11. This embodiment has many of the same functional features as the multi-piece clasp body 50 though they are formed somewhat different to enable the single piece manufacture. In the single piece clasp body 90, two pairs of opposing jaws 92, 94 are formed at the distal end of levers 96, 98. The levers 96, 98 are attached to the clasp body 90 by living hinges 102, 104. Between the opposing jaws 92, 94 is an alignment blade 106 (see FIG. 11A). Referring to FIG. 13, more precisely a pair of axially spaced alignment blades 106 is provided. In this embodiment an engaging tooth 108 is provided at a distal end of a flap 110.

Figure 14:
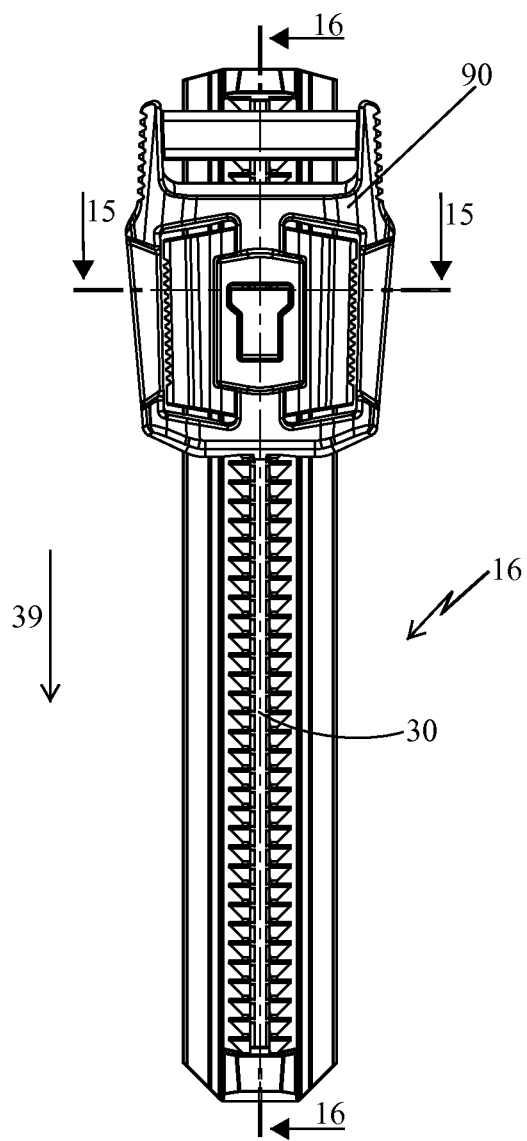
FIG. 14 is a plan view of the clasp body of FIG. 11 mounted to an elongate rail of FIG. 2.
Figure 15:
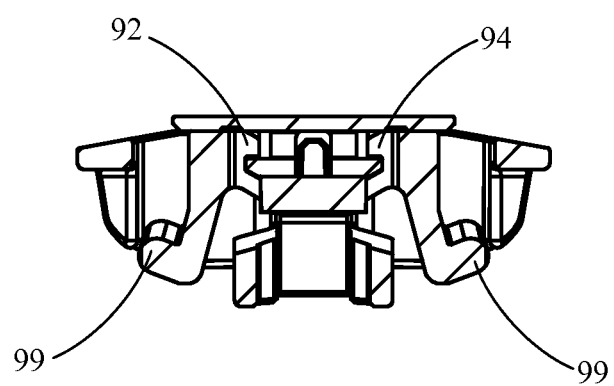
FIG. 15 is a cross-section taken along line 15-15 of FIG. 14.
Figure 16:
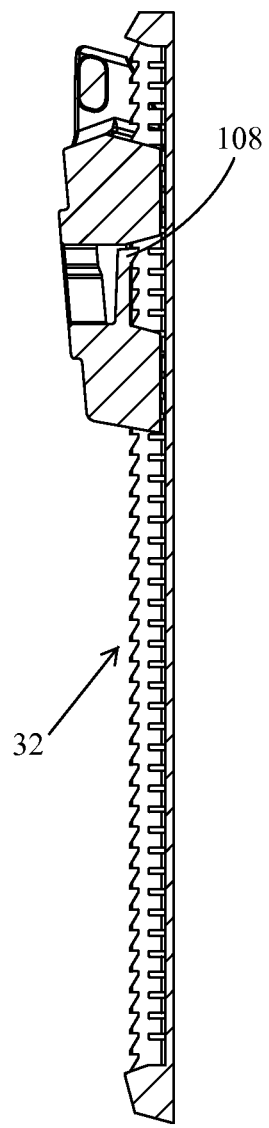
FIG. 16 is a cross-section taken along line 16-16 of FIG. 14.

In use, the single piece clasp body 90 functions much like the multi-piece clasp body 50. Referring to FIG. 14, to attach the single piece clasp body 90 to the securing rail 16, the alignment blade 106 is inserted in the alignment trough 30 and the top of the single piece clasp body 90 is pressed toward the securing rail 16 to snap the opposing jaws 92, 94 into engagement with the clasping flanges 28, as best viewed in FIG. 15. The engagement tooth 108 springs into engagement with the first plurality of spaced locking teeth 32 as best viewed in FIG. 16. The resilient nature of the thermoplastic from which the single piece clasp body 90 is integrally formed in a single molding operation provides the bias that locks the clasping flanges 28 between the opposing jaws 92, 94 and biases the engagement tooth 108 into engagement with the first plurality of spaced locking teeth 32. Because of the ratchet engagement between the engagement tooth 108 and the first plurality of spaced locking teeth 32, the single piece clasp body 90 can be moved in the direction of the arrow 39 in FIG. 14 by applying a force in the direction of the arrow 39. However, the single piece clasp body 90 cannot be moved a direction opposite the arrow 39. The single piece clasp body 90 is released from the securing rail 16 by squeezing the proximal ends 99 of the levers 96, 98 toward each other enough to disengage the opposing jaws 92, 94 from the clasping flange 28.

The clasp body and the track of the various embodiments can be made of any suitably resilient and durable thermoplastic, metal, composite or other suitable material. Suitable plastics include but are not limited to nylon.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:
1. A clasp comprising:
a securing rail, the securing rail comprising an elongate rail comprising a rail top, a pair of opposing clasping flanges extending lengthwise of the rail, a first plurality of locking teeth spaced and extending lengthwise of the rail and an alignment trough in the top extending lengthwise of the rail; and
a clasp body comprising, a pair of opposing jaws operatively associated with the clasp body, each of the opposing jaws being configured to receive one of the clasping flanges of the elongate rail, the opposing jaws being further configured to bias toward each other with the clasping flanges received therein to nest the clasping flanges between the opposing jaws and to secure the clasp body to the rail against radial movement relative to the rail and an alignment blade extending from the clasp body, the alignment blade being configured to be received in the alignment trough with the opposing jaws receiving the clasping flanges, at least one engaging tooth on a distal end of a resilient flap extending from clasp body biased by the resilient flap into engagement with the first plurality of locking teeth to secure the clasp body against movement in at least one axial direction lengthwise of the elongate rail with the clasping flanges received in the clasp body and a pair of opposing levers, each lever being operatively associated with a jaw and the clasp body, the levers being configured so upon being squeezed together a first distance the jaws release the clasping flanges so that the clasp body can be moved radially relative to the clasping flanges.

2. The clasp of claim 1 further comprising the clasp body being integrally molded from a resilient plastic.

3. The clasp of claim 2 further comprising the resilient plastic causing the jaws to bias toward each other.

4. The clasp of claim 1 wherein the at least one engaging tooth and the plurality of locking teeth are configured for ratchet engagement, whereby the clasp body can slide one axial direction but not an opposite axial direction relative to the elongate rail with clasping flanges nested between the opposing jaws.

5. The clasp of claim 1 wherein the alignment blade extends lengthwise of the clasp body and is configured to be received lengthwise of the alignment trough.

6. The clasp of claim 5 wherein the alignment blade comprises first and second alignment blade segments with a gap therebetween.

7. The clasp of claim 6 wherein the engaging tooth resides in the gap between the first and second alignment blade segments.

8. The clasp of claim 1 wherein the resilient flap extends lengthwise of the of the clasp body in alignment with the alignment blade.

9. A clasp comprising:
a securing rail, the securing rail comprising an elongate rail comprising a rail top, a pair of opposing clasping flanges extending lengthwise of the rail, a first plurality of locking teeth spaced and extending lengthwise of the rail and an alignment trough in the top extending lengthwise of the rail; and
a clasp body comprising, a pair of opposing jaws operatively associated with the clasp body, each of the opposing jaws being configured to receive one of the clasping flanges of the elongate rail, the opposing jaws being further configured to bias toward each other with the clasping flanges received therein to nest the clasping flanges between the opposing jaws and to secure the clasp body to the rail against radial movement relative to the rail and an elongate alignment blade extending lengthwise along and from the clasp body, the alignment blade being configured to be received lengthwise in the alignment trough with the opposing jaws receiving the clasping flanges, at least one engaging tooth operatively associated with the clasp body biased into engagement with the first plurality of locking teeth to secure the clasp body against movement in at least one axial direction lengthwise of the elongate rail with the clasping flanges received in the clasp body and a pair of opposing levers, each lever being operatively associated with a jaw and the clasp body, the levers being configured so upon being squeezed together a first distance the jaws release the clasping flanges so that the clasp body can be moved radially relative to the clasping flanges.

10. The clasp of claim 9 wherein the alignment blade comprises first and second alignment blade segments with a gap therebetween.

11. The clasp of claim 10 wherein the engaging tooth resides in the gap between the first and second alignment blade segments.

12. The clasp of claim 9 wherein the engaging tooth extends from a distal end of a resilient flap extending from the clasp body, the engaging tooth being biased by the resilient flap into engagement with the first plurality of locking teeth.

* * * * *